United States Patent [19]

Murthy

[11] 3,949,101

[45] Apr. 6, 1976

[54] HIGH PROTEIN PASTA FORMULATION

[75] Inventor: Paluri Ramachandra Murthy, Hershey, Pa.

[73] Assignee: Peavey Company, Minneapolis, Minn.

[22] Filed: Feb. 8, 1974

[21] Appl. No.: 440,839

[52] U.S. Cl. ............................................... 426/557
[51] Int. Cl.² ............................................ A23L 1/16
[58] Field of Search ........... 426/158, 343, 356, 346, 426/557

[56] References Cited

UNITED STATES PATENTS 3,762,931  10/1973  Craig et al. .................. 426/346

Primary Examiner—Raymond N. Jones
Attorney, Agent, or Firm—Orrin M. Haugen

[57] ABSTRACT

A high protein pasta formulation consisting of a blend of from about 84% up to about 95% of the semolina fraction of durum wheat, with the balance of from 5% to 16% being essentially a mixture of undenatured whey solids containing about 50% whey protein.

7 Claims, No Drawings

HIGH PROTEIN PASTA FORMULATION

BACKGROUND OF THE INVENTION

The present invention relates generally to a high protein pasta formulation, and more specifically to such a formulation which utilizes a blend of from about 84% up to about 95% of semolina, with the balance being modified whey solids. The modified whey solids consist essentially of low lactose whey solids containing 50% whey protein. Undenatured whey solids are commercially available, wherein the whey has been modified so as to reduce the normal lactose content with a resultant proportional increase in the whey protein present in the product. Modified whey protein is prepared through a gel filtration process wherein lactose is retained as the filter cake, with the whey protein passing through. In the finished product, the solids remain undenatured and contain about 50% whey protein. The undenatured character of the whey solids contributes and enhances the pasta formulations prepared pursuant to the present invention.

Pasta formulations are widely utilized as a food product throughout the world, with these products normally being in the form of spaghetti, macaroni, noodles, or the like. Normally, pasta formulations are prepared by forming a paste of flour and water, occasionally mixed with eggs, with the paste being extruded under conditions of high pressure into a product having the desired final shape and configuration. Semolina is normally prepared as the coarse fraction of durum wheat, with this material being, of course, widely available commercially.

In the preparation of food products from pasta formulations, the spaghetti, macaroni, noodles, or the like is normally immersed in boiling water, with the immersion continuing until the pasta has become soft, pliable, and capable of normal chewing. One of the problems frequently encountered in cooked pasta products is the tendency of the material to become sticky, soft, and generally lacking in firmness or body. As the cooking process continues, which is frequently encountered on steam tables or the like, the product may become unacceptable as a normal food because of the deterioration of its physical properties.

Pasta formulations which consist essentially of semolina are frequently low in protein efficiency ratios (PER). Inasmuch as modified whey solids can be utilized to enhance the protein efficiency ratio of foods, a high protein pasta formulation may be prepared with enhanced nutritional capabilities. The protein efficiency ratio of normal semolina is generally in the range of about 0.75 – 0.8, however with the addition of modified whey solids, this ratio can be increased to a value greater than about 2.4.

This enhancement of the protein efficiency ratio is obtained with a corresponding increase in the extrudability of the product, as well as its cooking properties. The product retains its light yellow or golden color, and when cooked as a spaghetti or macaroni product, it has an enhanced bite quality, without a strong tendency to become pasty or sticky. The uncooked product has a desirable appearance, with equal gloss along the length of the pasta shafts, along with good brightness and sheen. The product, when initially cooked, is non-sticky and possesses a bite characterized as "Al Dente" and because of its low water absorption, is stable when cooked, even when retained on a steam table over an extended period of time. Thus, the cooked product is capable of extended or long exposure to steam environments. It is believed that this improvement is physical characteristics is attributable to the heat coagulation property of the undenatured whey solids. This characteristic is achievable inasmuch as the protein matrix is highly miscible with the semolina material, and enhances the workability of the dough material, and reduces its sticky character.

As indicated, the functional or extrudability characteristics of the formulation are found to be superior to that of normal semolina. Thus, the product does not require special treatment, special operations, or the like. The extruded product has been found to have a greater degree of cohesiveness than is present in normal extruded semolina. Furthermore, the sheeting and drying characteristics of the product are also enhanced.

In the past, various milk products have been utilized for enrichment of pasta formulations. Frequently, such enrichment has been accomplished with a deterioration in the physical properties. For example, casein which normally contains a substantial portion of milk protein has been found undesirable from the standpoint of its inability to heat coagulate. Thus, pasta formulations enriched in this fashion tend to become slimy upon cooking.

Alternatively, other sources of milk proteins have been utilized for enrichment of pasta formulations. These materials have generally suffered from the disadvantage of being separated from their original solvent substance by coagulation. The coagulated material, when dried, is normally considerably if not entirely denatured, thus the heat coagulation property of the milk protein has been lost in pasta formulations enriched in this fashion.

It is normally recognized that the physical characteristics of protein formulations containing high quantities of added proteins are largely influenced by the physical and chemical properties of the added proteins. This includes the swelling characteristics, solubility, elasticity, and the general capability of preparing a product having good texture.

The formulations of the present invention may, if desired, contain a quantity of soy protein isolate, with this component further enhancing the protein efficiency ratio of the product, with this soy protein not adversely affecting the extrudability or cooking characteristics of the product.

SUMMARY OF THE INVENTION

Therefore, it is a primary object of the present invention to provide an improved pasta formulation which includes semolina and modified whey solids, with the formulation having an elevated protein efficiency ratio, along with improved processing characteristics.

It is yet a further object of the present invention to provide an improved high protein pasta formulation which utilizes a blend of semolina and modified whey solids, wherein the finished product has enhanced or improved stability upon a continued exposure to moist heated environments.

It is yet a further object of the present invention to provide an improved high protein pasta formulation which consists of a blend of semolina, modified whey solids, and soy protein concentrate or isolate.

Other and further objects of the present invention will become apparent to those skilled in the art upon a study of the following specification and appended claims.

DESCRIPTION OF THE PREFERRED EMBODIMENT

In order to best disclose the various concepts of the present invention, the following specific examples are provided:

EXAMPLE 1

High protein pasta was prepared having the following formulation:

| Component | Percentage |
| --- | --- |
| Semolina | 88 % |
| Whey solids (dry whey solids containing 50% whey protein) | 12 % |

This formulation was dry-blended until homogeneous. A dough was prepared containing 25 pounds water per 100 pounds of blended flour and thereafter placed in a conventional extruder and a spaghetti product was formed having highly extrudable characteristics, along with a uniform light yellow or golden color. The extruded product was dried for 34 hours at 100° F. The finished product has a protein content of approximately 23%, which is increased from the normal protein content of approximately 14% for semolina. The protein efficiency ratio (PER) is increased from a normal level of about 0.7 up to about 2.4 with that of pure casein being about 2.5.

EXAMPLE 2

High protein pasta was prepared having the following formulation:

| Component | Percentage |
| --- | --- |
| Semolina | 84 % |
| Whey solids (dry whey solids containing 50% whey protein) | 16 % |

This formulation was treated pursuant to the procedure followed in connection with Example 1, and a product was obtained having highly extrudable characteristics along with a uniform light yellow or golden color.

EXAMPLE 3

High protein pasta was prepared having the following formulation:

| Component | Percentage |
| --- | --- |
| Semolina | 95 % |
| Whey solids | 5 % |

This formulation was treated pursuant to the procedure followed in connection with Example 1, and a product was obtained having highly extrudable characteristics along with a uniform light yellow or golden color.

EXAMPLE 4

High protein pasta was prepared having the following formulation:

| Component | Percentage |
| --- | --- |
| Semolina | 83.5 % |
| Whey solids | 11.5 % |
| Soy protein isolate (containing 90% soy protein) | 5 % |

This formulation was treated pursuant to the procedure followed in connection with Example 1, and a product was obtained having highly extrudable characteristics along with a uniform light yellow or golden color.

EXAMPLE 5

High protein pasta was prepared having the following formulation:

| Component | Percentage |
| --- | --- |
| Semolina | 8.35 % |
| Whey solids | 11.5 % |
| Soy protein concentrate (containing 70% soy protein) | 5 % |

This formulation was treated pursuant to the procedure followed in connection with Example 1, and a product was obtained having highly extrudable characteristics along with a uniform light yellow or golden color.

EXAMPLE 6

High protein pasta was prepared having the following formulation:

| Component | Percentage |
| --- | --- |
| Semolina | 85 % |
| Whey solids | 12 % |
| Soy protein isolate (containing 90% soy protein) | 3 % |

This formulation was treated pursuant to the procedure followed in connection with Example 1, and a product was obtained having highly extrudable characteristics along with a uniform light yellow or golden color.

GENERAL DISCUSSION

It has been found that the present formulation increases the protein content significantly, with a corresponding increase in the protein efficiency ratio. In this connection, this increase in both protein content and protein efficiency ratio is obtained along with an enhanced bond or cohesiveness being formed in the extruded product. In the cooked product, firmness is increased while stickiness is decreased.

SEMOLINA

Semolina is, of course, a commercially available product obtained as the coarse fraction of durum wheat. Durum wheat is thus the primary source of commercial semolina. This product may contain from 12% to 16% protein, along with a normal moisture content of about 13%. Even with this protein content, however, the protein efficiency ratio of normal semolina ranges from between about 0.6 up to about 0.8, with this being significantly increased with the addition of modified whey solids so as to form a blend.

MODIFIED WHEY SOLIDS

Whey solids, containing 50% whey protein, are employed in the formulation to enhance physical as well as protein characteristics. The modified whey solids are utilized as a substitute for the egg protein which may have been utilized in the past, with this additive enhancing the physical, nutritional, as well as the color of the finished product.

If the low lactose high protein whey solids are contained in the pasta formulation in a concentration of greater than 16%, the coagulation strength becomes significantly high so as to detract from the physical properties of the cooked product. On the other hand, if less than 5% of modified whey solids containing 50% whey protein and low lactose are added, the protein efficiency ratio is not significantly enhanced, and the improvement in heat coagulation is not significant. These properties are significantly improved when greater than 5% of the whey solids are added.

As has been pointed out, the modified whey material contains a greater proportion of protein inasmuch as the protein has been retained along with a corresponding reduction in the lactose content. This material, as utilized, retains its lacto-albumin function, this also contributing to the enhanced characteristics. Modified whey solids of this type are available from the Stauffer Chemical Company of Westport, Connecticut under their Code Mark "ENRPRO 50". It is this material which has been utilized in the formulations of Examples 1–6 inclusive hereinabove.

SOY PROTEIN ISOLATE

Soy protein isolate is utilized as a component in the formulation in the range of from about 3% up to about 8% of soy protein isolate. Soy protein isolate normally contains about 90% soy protein, with this material also being commercially available.

Soy protein concentrate may be used interchangeably with soy protein isolate, with this material containing only about 70% of soy protein. The term "soy protein isolate" is being used in a comprehensive sense and is intended to cover soy protein concentrate containing soy protein in quantities as low as about 70%.

I claim:

1. High protein pasta formulation consisting of a blend of from about 84% up to about 95% of semolina, with the balance of from 5% to 16% of said pasta formulation being essentially dry whey solids containing about 50% of undenatured whey protein.

2. The high protein pasta formulation as defined in claim 1 wherein said formulation consists of a blend of from about 84% up to about 88% semolina with the balance of from 12% to 16% of said formulation being essentially a mixture of dry whey solids containing about 50% undenatured whey protein, balance lactose.

3. The high protein pasta formulation as defined in claim 1 wherein said formulation consists of a blend of 88% semolina, balance of 12% being essentially a mixture of dry whey solids containing about 50% undenatured whey protein, balance lactose.

4. The high protein pasta formulation as defined in claim 1 wherein said formulation contains from 3% to 8% soy protein isolate containing greater than about 70% soy protein.

5. The high protein pasta formulation as defined in claim 1 wherein said formulation contains from between about 82% up to about 85% semolina, 12% of dry whey solids containing about 50% undenatured whey protein, balance of said whey solids being lactose, and said formulation further containing from between about 3% to about 6% soy protein isolate.

6. The high protein pasta formulation as defined in claim 5 wherein said soy protein isolate consists of from 90% to 95% soy protein.

7. The method of preparing a high protein pasta formulation which comprises blending a solids mixture of from about 84% up to about 95% of semolina, with the balance of from 5% to 16% solids being essentially dry whey solids containing about 50% of undenatured whey protein, balance of said whey solids being lactose, with the blending operation being conducted until the formulation becomes uniform, and thereafter adding water in an amount of about 25 pounds water to 100 pounds solids and thence extruding said formulation into a food product.

* * * * *

UNITED STATES PATENT OFFICE
CERTIFICATE OF CORRECTION

PATENT NO. : 3,949,101
DATED : April 6, 1976
INVENTOR(S) : Paluri Ramachandra Murthy It is certified that error appears in the above-identified patent and that said Letters Patent are hereby corrected as shown below:

Column 2, line 3, "is" (second occurrence) should read -- in --.

Column 4, in Example 5, the Semolina content should read -- 83.5% -- rather than "8.35%".

Signed and Sealed this eighth Day of June 1976

[SEAL]

Attest:

RUTH C. MASON
Attesting Officer

C. MARSHALL DANN
Commissioner of Patents and Trademarks